United States Patent
Crisan

(10) Patent No.: US 7,133,680 B2
(45) Date of Patent: Nov. 7, 2006

(54) METHOD FOR ASSIGNING FREQUENCIES TO BASE STATIONS OF A MOBILE TELEPHONE NETWORK

(75) Inventor: Christine Crisan, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 316 days.

(21) Appl. No.: 10/476,123

(22) PCT Filed: Apr. 30, 2002

(86) PCT No.: PCT/DE02/01568

§ 371 (c)(1),
(2), (4) Date: Jun. 8, 2004

(87) PCT Pub. No.: WO02/091774

PCT Pub. Date: Nov. 14, 2002

(65) Prior Publication Data

US 2004/0209619 A1  Oct. 21, 2004

(30) Foreign Application Priority Data

May 5, 2001  (DE) ................. 101 21 978

(51) Int. Cl.
*H04Q 7/20* (2006.01)

(52) U.S. Cl. .............. 455/450; 455/446; 455/447; 455/451; 455/452; 455/509; 455/63; 455/62

(58) Field of Classification Search ........... 455/446, 455/447, 450, 451, 452.1, 452.2, 509, 63, 455/62
See application file for complete search history.

(56) References Cited

U.S. PATENT DOCUMENTS

| | | | |
|---|---|---|---|
| 5,507,007 A | 4/1996 | Tegth et al. | |
| 5,722,043 A | 2/1998 | Rappaport et al. | |
| 5,943,622 A | 8/1999 | Yamashita | |
| 5,966,657 A * | 10/1999 | Sporre | 455/425 |
| 6,052,593 A | 4/2000 | Guimont et al. | |
| 6,085,093 A | 7/2000 | Faruque et al. | |
| 6,212,384 B1 * | 4/2001 | Almgren et al. | 455/446 |

FOREIGN PATENT DOCUMENTS

| | | |
|---|---|---|
| EP | 0 802 695 A | 10/1997 |
| GB | EP 0 802 695 A | 10/1997 |
| GB | EP 0 847 213 A2 | 6/1998 |
| WO | WO94/17640 | 8/1994 |
| WO | WO99/53705 | 10/1999 |

* cited by examiner

*Primary Examiner*—Joseph Feild
*Assistant Examiner*—David Q. Nguyen
(74) *Attorney, Agent, or Firm*—Christa Hildebrand Norris McLaughlin & Marcus PA

(57) ABSTRACT

The invention relates to a method for allocating frequencies to base stations in a mobile telephone network, especially a method for automatically resetting frequencies already allocated in the case of non-saturated base stations and re-allocating frequencies to said base stations. Firstly, frequencies are allocated to base stations using any known prior art method. In the case where no non-saturated base station is present, a complete frequency plan is obtained. However, if some base stations are not saturated, the inventive method is carried out: the current frequency allocation is reset and a new frequency allocation is carried out automatically. A parameter, the resetting extent parameter, is used to determine to which extent the resetting method is implemented.

8 Claims, 2 Drawing Sheets

METHOD FOR ASSIGNING FREQUENCIES TO BASE STATIONS OF A MOBILE TELEPHONE NETWORK

BACKGROUND OF THE INVENTION

The invention relates to a method for allocating frequencies to base stations in a mobile telephone network, and in particular to a method for automatically resetting already allocated frequencies in the event of non-saturated base stations and reallocating frequencies to the base stations.

In conjunction with the expansion of an existing mobile telephone network, for example by adding new base stations, it may happen that several of the newly added base stations are non-saturated after a frequency has been allocated, which is typically performed with the help of EDP-supported methods. In other words, a lesser number of frequencies than required are (can be) allocated to the base stations.

There are essentially two reasons why these base stations are non-saturated after a method for allocating frequencies has been applied. On one hand, it may involve base stations which cannot reach saturation due to a combination of the network structure and the planning parameters; on the other hand, it may involve base stations which cannot receive the allocation of the desired number of frequencies that are free from interference due to earlier allocations of frequencies to "old" base stations. In the second case, there remains in principle the possibility to achieve a saturation of the base stations by retuning "old" frequency allocations, which would then allow an allocation of frequencies to the newly added stations. This second possibility has hitherto been performed manually by the mobile network planners. Manual processing not only requires that stations preventing an allocation are identified, but also requires determination of an optimal new allocation of frequencies.

SUMMARY OF THE INVENTION

It is an object of the present invention to provide a method which automatically allocates the respective number of required frequencies to non-saturated base stations, as far as this is possible.

The invention relates to a method for automatically resetting and reallocating frequencies to non-saturated base stations of a mobile telephone network, characterized in that it is checked in a first step, if combiner separations prevent a saturation of the base station and, if this is the case, then the corresponding frequencies are reset and reallocated. If a frequency could not be allocated to the base station in the previous step, it is checked in a second step, if—depending on the allocation mode—a Pn+1 frequency has the quality requirements for a Pn frequency, whereby if this is the case, the corresponding frequency is retuned and the frequencies are reallocated. In the event that no frequency could be allocated to the base station in the previous steps, frequencies at least one neighboring base station, which have a direct interference relationship with the particular base station and which prevent a frequency allocation to the particular station, are reset in a third step, whereby frequencies of the particular base station and the neighboring base station are reallocated. In the event that no frequency could be allocated to the base station in the previous steps, the frequencies at least one neighboring base station, which prevents an allocation by an indirect interference relationship with the particular base station, are reset, whereby frequencies are reallocated to the particular base station and the neighboring base station.

Further, in the event that no replacement frequency could be allocated to the neighboring base station according to the third or fourth step, the particular base station remains non-saturated and the reset frequency is reallocated to the neighboring base station.

In addition, if no replacement frequency could be allocated to the neighboring base station due to other base stations, the corresponding frequencies of the other base stations that interfere with the neighboring base stations are reset, whereby subsequently the frequencies are reallocated at all those stations where frequencies had been reset.

The frequencies are generally allocated according to the frequency requirements with a selected priority. The resetting process treats BS with non-saturated frequency requirements with respect to priority in the same way as with respect to frequency allocation. Frequencies with a priority other than that of the actual frequency allocation step can also be retuned. If several valid solutions are determined for one of the aforedescribed steps, the solution with the smallest number of frequencies to be reset is selected. If there are several solutions with the same number of frequencies to be reset, then the quality of the frequencies to be reset determines the selection of the solution, whereby frequencies with the priority Pn are preferably reset before the priorities Pn−1.

The method is preferably implemented in the form of software.

Advantageously, the described method automatically recognizes those base stations whose frequencies prevent new allocations, and
cancels these existing allocations,
automatically replaces the canceled frequency allocations with new frequencies, and
allocates frequencies to the originally non-saturated base stations.

This significantly simplifies the tasks of the mobile network planners, since the method is executed entirely automatically, thus eliminating the need for a manual frequency allocation.

An embodiment of the invention will be described in more detail hereinafter with reference to the drawings. This results in additional features, advantages and applications of the method.

DETAILED DESCRIPTION OF THE PRESENTLY PREFERRED EMBODIMENTS

Frequency allocation is directed to allocation of frequencies to base stations (BS). The allocation must satisfy certain boundary conditions which essentially reduce interference in a mobile telephone network.

A BS typically requires more than one frequency.

The frequencies required at a base stations are initially assigned a priority. The frequencies are allocated to the base stations in the order of their priority. Frequencies with the highest priority are allocated to important control channels (e.g., BCCH: Broadcast Control Channel). Thereafter, the frequencies with a second priority for the traffic channels (TCH: Traffic Channel) and frequencies with a third priority for other channels (e.g., HTCH) are allocated.

Example: a base station requires four frequencies. A prioritization can look as follows: the base station requires one frequency of the Priority 1, one frequency of the Priority 2 and two frequencies of the Priority 3.

In this case, first a frequency of the Priority 1 is allocated to the base station. If an allocation is successful, i.e., the frequency could be allocated to the BS, then a frequency of the Priority 2 is allocated to the BS. Thereafter, if the allocation of the frequency with the Priority 2 was successful, two frequencies of the Priority 3 are allocated to the BS.

Hereinafter, the frequencies with the different prioritizations will be referred to as P1 (Priority 1), P2, P3, etc. In general, frequencies of the Priority 1 have to be allocated before frequencies with the Priority 2 are allocated, etc.

Figure 1:
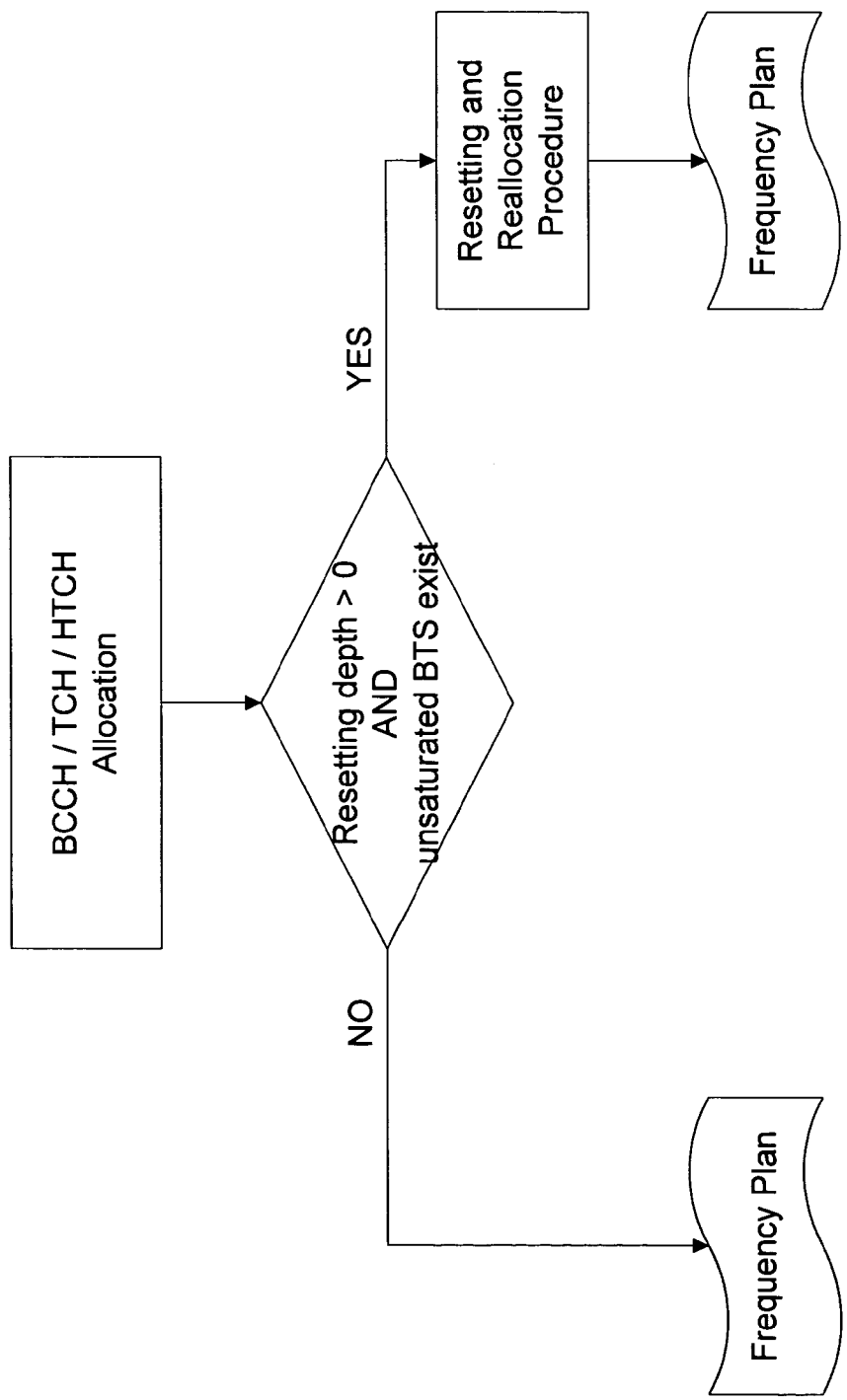
FIG. 1 a functional process flow of the frequency allocation with automatic resetting and reallocation.

The functional process flow is illustrated in FIG. 1: initially, a known conventional method is used to allocate the frequencies. If there are no non-saturated base stations, a complete frequency plan is obtained. Conversely, if non-saturated base stations exist, then the method according to the invention is executed, i.e., the existing frequency allocation is reset and frequencies are subsequently automatically reallocated. The extent of the resetting process is controlled, inter alia, by a parameter, the resetting depth parameter.

The basic principle of the method for resetting frequencies includes essentially four steps:

Step 1: it is first checked if combiner separations prevent a saturation of the station. If this is a case, then the corresponding frequencies are reset and reallocated, thereby increasing the degree of saturation of the station. The term combiner separation refers to the separation between frequencies used at a base station. Exceedingly strong interferences between the frequencies can be prevented by setting a certain fixed combiner separation.

Example: the frequency 16 is allocated to a station as a P1 frequency, but the station requires another P2 frequency. In this example, the set of available frequencies is assumed to be {14, 15, 16, 17, 18}, and the combiner separation is assumed to be equal to 3. All frequencies are assumed to be essentially acceptable as both P1 and P2 frequencies. However, the frequencies 14, 15, 17 and 18 cannot be allocated as P2 frequencies due to the combiner separation. Consequently, no P2 frequency can be allocated to the station. However, retuning the P1 frequency from 16 to 14 makes it possible to allocate the frequency 17 as a P2 frequency. Accordingly, the frequencies 14 and 17 can now be allocated to the station as P1 and P2 frequencies, respectively.

Step 2: if the first step is not successful, i.e., if no P2 frequency can be allocated to the base station in this step, then it is checked in a second step if—depending on the allocation mode—a Pn+1, Pn+2, Pn+3, etc., frequency meets the quality requirements for a Pn frequency, i.e., a frequency with a higher priority. If this is the case, then the corresponding frequency is retuned, for example, a P2 frequency is elevated to a P1 frequency. If feasible, the retuned frequency is newly allocated. In general, a Pn frequency may be retuned as a Pn-1, Pn-2, . . . , P1 frequency.

Example: assuming there is a station to which the frequency 16 was allocated as a P2 frequency. The station still requires a P1 frequency. Be the set of the allowed frequencies {14, 15, 16, 17, 18}, with the combiner separation being equal to 3. It will be assumed that the frequencies 14, 15, 17 and 18 are not to be permissible for the base station under consideration due to allocations to other stations. If the frequency 16 also has P1 quality, then it is retuned to the P1 frequency. However, the BS then no longer has a P2 frequency. If there was another frequency that was permissible at the station as a P2 frequency, then the method would also allocate this frequency. The BS would then also have a P2 frequency.

Figure 2:
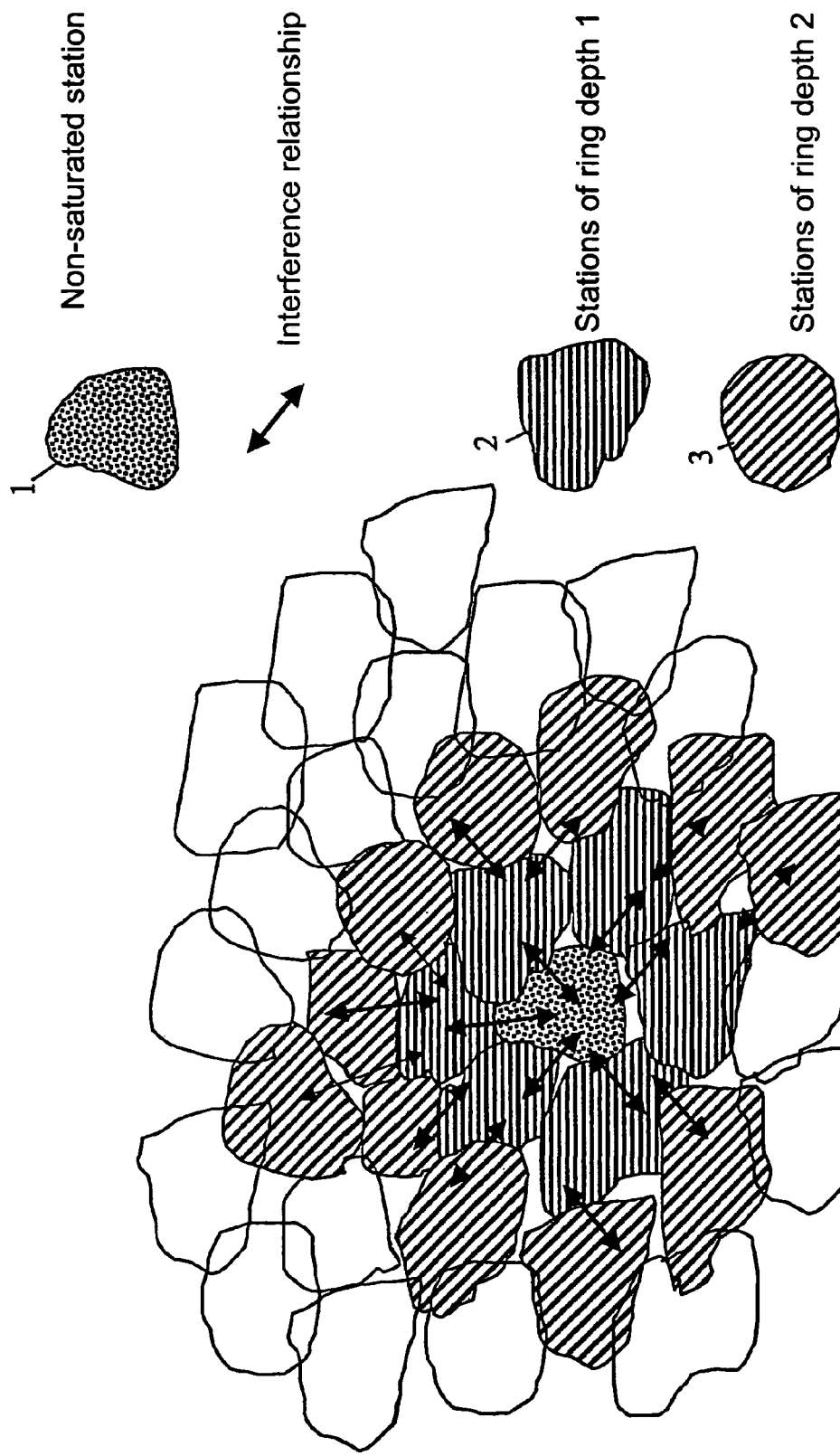
FIG. 2 an illustration of different resetting depths (ring depths) with reference to a cellular mobile telephone network.

Step 3: if the previous step is not successful, then frequencies are reset at stations that have a direct interference relationship with the actual station and hence prevent an allocation to the actual station. FIG. 2 shows schematically a detail of a cellular mobile telephone network, which includes a plurality of wireless cells 1, 2, 3, which are each supplied with radio signals by at least one base station (not shown in detail). The base stations have a mutual interference relationship, wherein base stations 2 located immediately adjacent to a base station 1 have typically a direct interference relationship with the corresponding base station, whereas more distal base stations 3 have typically only an indirect interference relationship with the base station 1. If a required frequency cannot be allocated to a corresponding station 1 solely due to pair-wise interference relationships, then the frequencies of the stations 2 that prevent this allocation are reset. This is performed by an algorithm if replacement frequencies could already been allocated to those stations that had been reset. This is referred to as resetting with the resetting depth 1 (ring depth 1).

Example: it will be assumed that a station A requires a P1 frequency. Be the frequencies set {14, 15, 16, 17, 18}, and combiner separation equal to 3. The frequencies 14 and 18 are assumed not to be allocatable based on a coordination obligation at that station. The term coordination obligation refers to limitations in the frequency selection and use at borders between countries. The frequency 16 was allocated to an interfering station B as a P1 frequency. Accordingly, the frequencies 15, 16 and 17 cannot be allocated to the station A. In this case, the resetting method resets the P1 frequency of the interfering station, allocates for example the frequency 16 to the station A and subsequently allocates the frequency 14 to the station B. However, if no replacement frequency can be allocated to the interfering station, then the station A remains non-saturated and the frequency at the station B that was reset is again allocated. This example is graphically illustrated in Table 1. The various columns indicate the existing frequency spectrum. The rows show the frequency situation at the stations A and B before and after automatic resetting and reallocation.

| Frequencies | 14 | 15 | 16 | 17 | 18 |
| --- | --- | --- | --- | --- | --- |
| Station A: | L | N | N | N | L |
| Station B: | C | C | X | C | C |
| Station A: | N | N | X | C | L |
| Station B: | X | N | N | N | * |

Legend:
X: allocated BCCH frequency
C: forbidden frequency based on combiner separation
L: forbidden frequency based on coordination obligation
N: forbidden frequency based on interference from another station
*: frequency allowed as BCCH.

Step 4: if the previous step was also not successful and if the resetting depth parameter is greater than 1, then the frequencies are reset at those neighboring stations 3 that previously prevented an allocation by an indirect interference relationship with the respective base station 1.

The following statement can be made with reference to the previous example: if a frequency cannot be allocated to the interfering station B due to the interfering station B due to the other stations (interfering stations), then the frequencies of the interferes of station B are reset. Frequencies are thereafter allocated to all those stations where frequencies had been reset.

FIG. 2 shows the base station 3 with resetting depth 2.

The frequencies are generally allocated for the frequency requirements of a selected priority. The resetting process treats BS with non-saturated frequency requirements with respect to priority in the same way as with respect to frequency allocation. However, frequencies with priorities other than those of the frequency allocation step can also be retuned. If several valid solutions for one of the aforedescribed steps are determined, then the solution with the smallest number of reset frequencies is selected. If several solutions with the same number of frequencies to be reset exist, then the quality of the frequencies to be reset controls. Preferably, Pn frequencies are reset before Pn−1 frequencies are reset.

The invention claimed is:

1. A method for automatically resetting and reallocating frequencies to non-saturated base stations of a mobile telephone network, comprising the steps of
   (a) checking if combiner separations prevent a saturation of the base station and, if this is the case, then the corresponding frequencies are reset and reallocated;
   (b) checking if a frequency could not be allocated to the base station in the previous step, if—depending on the allocation mode—a Pn+1 frequency has the quality requirements for a Pn frequency, and, if this is the case, the corresponding frequency is retuned and the frequencies are reallocated;
   (c) resetting, in the event that no frequency could be allocated to the base station in the previous steps, frequencies at least one neighboring base station, which have a direct interference relationship with the particular base station and which prevent a frequency allocation to the particular station, whereby frequencies of the particular base station and the neighboring base station are reallocated;
   (d) resetting, in the event that no frequency could be allocated to the base station in the previous steps, the frequencies at least one neighboring base station, which prevents an allocation by an indirect interference relationship with the particular base station, whereby frequencies are reallocated to the particular base station and the neighboring base station.

2. The method according to claim 1, wherein in the event that no replacement frequency could be allocated to the neighboring base station according to the step (c) or (d), the particular base station remains non-saturated and the reset frequency is reallocated to the neighboring base station.

3. The method according to claim 1, wherein, if no replacement frequency could be allocated to the neighboring base station due to other base stations, the corresponding frequencies of the other base stations that interfere with the neighboring base stations are reset, whereby subsequently the frequencies are reallocated at all those stations where frequencies had been reset.

4. The method according to claim 1, wherein the frequencies are generally allocated according to the frequency requirements with a selected priority.

5. The method according to claim 1, wherein the resetting process treats BS with non-saturated frequency requirements with respect to priority in the same way as with respect to frequency allocation.

6. The method according to claim 1, wherein frequencies with a priority other than that of the actual frequency allocation step can also be retuned.

7. The method according to claim 1, wherein, if several valid solutions are determined for one of the steps (a) through (d), the solution with the smallest number of frequencies to be reset is selected.

8. The method according to claim 1, wherein, if there are several solutions with the same number of frequencies to be reset, then the quality of the frequencies to be reset determines the selection of the solution, whereby frequencies with the priority Pn are preferably reset before the priorities Pn−1.

* * * * *